United States Patent [19]

Klosin et al.

[11] Patent Number: 4,859,812

[45] Date of Patent: Aug. 22, 1989

[54] FLAT CABLE AND SEALING ELEMENT

[75] Inventors: John J. Klosin; J. William Venezia, both of Ormond Beach, Fla.

[73] Assignee: Homac Mfg. Company, Ormond Beach, Fla.

[21] Appl. No.: 7,681

[22] Filed: Jan. 28, 1987

[51] Int. Cl.$^4$ ................... H02G 15/013; H02G 15/04; H01B 17/58

[52] U.S. Cl. .................. 174/135; 174/65 R; 174/74 A; 174/77 R; 174/93; 174/152 G; 277/237 R

[58] Field of Search ............... 174/50.56, 65 R, 65 G, 174/65 SS, 74 A, 77 R, 82, 93, 135, 138 F, 151, 152 R, 152 G, 153 R, 153 G, 167, 87, 154, 163 R; 439/135, 146, 149, 150, 271, 272, 274, 275, 278, 279, 281, 283, 447, 521, 523, 587, 588, 589, 750, 892; 277/178, 237 R; 138/96 R; 215/317; 220/352; 248/56, 188.9; 16/2, 116 R, 42 R, 42 T; 24/129 A, 129 D

[56] References Cited

U.S. PATENT DOCUMENTS

| | | | |
|---|---|---|---|
| 585,058 | 6/1897 | Stone | 138/115 |
| 2,062,400 | 12/1936 | Dann | 174/65 SS X |
| 2,225,472 | 12/1940 | Franklin | 174/153 G X |
| 2,308,286 | 1/1943 | Joyce | 174/87 |
| 2,643,362 | 6/1953 | Johansson | 439/146 |
| 2,716,255 | 8/1955 | Laure | 16/42 R |
| 2,769,169 | 10/1956 | Munzig | 174/163 R X |
| 2,827,509 | 3/1958 | Wayman | 174/77 R |
| 2,908,470 | 10/1959 | Garman | 174/154 X |
| 2,943,373 | 7/1960 | Rapata | 24/662 |
| 3,240,863 | 3/1966 | Brede | 174/154 X |
| 3,528,051 | 9/1970 | Toedtman et al. | 439/523 |
| 3,773,243 | 11/1973 | Greene | 220/90.2 X |
| 3,784,723 | 1/1974 | Cantamessa | 174/42 |
| 3,979,553 | 9/1976 | Smart | 174/42 |
| 4,319,073 | 3/1982 | Kretschmer et al. | 174/73 R |
| 4,513,954 | 4/1985 | Cantamessa | 16/2 X |
| 4,520,229 | 5/1985 | Luzzi et al. | 174/73 R |
| 4,733,015 | 3/1988 | Barnes | 174/65 R |

FOREIGN PATENT DOCUMENTS

| | | | |
|---|---|---|---|
| 0098253 | 1/1984 | European Pat. Off. | 219/548 |
| 1448679 | 6/1966 | France | 174/138 F |
| 758346 | 8/1980 | U.S.S.R. | 174/74 A |

Primary Examiner—Laramie E. Askin
Attorney, Agent, or Firm—John E. Benoit

[57] ABSTRACT

A sealing element is provided for use on insulated flat cables which comprises an elongated body of resilient material having an orifice extending longitudinally within said body. The orifice has a width greater than its height. Opposed involute walls extend within said orifice substantially along the width of the orifice whereby the involute walls stretch and conform to the opposed substantially flat parallel major surfaces of the flat cable when placed thereon, thus providing a secure, watertight interference fit. Depending upon usage, the orifice may extend through the body or terminate within the body. Additionally, it is preferred that sealing rings be formed in the inner wall of the orifice.

9 Claims, 4 Drawing Sheets

FLAT CABLE AND SEALING ELEMENT

This invention is directed a flat cable and sealing element which provides an interference fit about the flat cable.

BACKGROUND OF THE INVENTION

Flat cable, commonly known as "Romex," has been in common use for many years, particularly for interior wiring. More recently this cable, available with two conductors and ground and three conductors and ground, has been used in underground submersible applications. Typical applications are in street lighting and in wiring to instrument transformers and similar control devices having relatively low ampacity demand. Also, this cable is now used for service entrances.

In submersible applications, where watertight security is required, taping and compounding at terminations and splices is now the common practice. Such a practice, while necessary, requires a great deal of time and effort, which increases the labor costs of any installation.

In industrial and residential applications where watertight connections are required, present practice in wiring to boxes and other enclosures is to use metalic connectors with internal rubber, neoprene, or plastic bushings. Bushings are clamped around the cable insulation to produce the required seal. While effective seals may be made, performance relies on the amount of clamping pressure applied by the electrician.

The present invention provides a means for sealing junctures of flat cable through the use of premolded, interference fit seals which provide a constant predetermined pressure seal at installation, eliminating the need for taping, compounding, or the use of clamps.

SUMMARY OF THE INVENTION

The present invention provides a flat cable having opposed rounded minor surfaces and opposed substantially flat parallel major surfaces and a sealing element for use thereon comprising an elongated body of resilient material having an orifice extended longitudinally within said body. The orifice has a width greater than its height and a periphery smaller than that of the flat cable to be installed therein. At installation the seal assumes the configuration of the cable while applying a predetermined secure watertight interference fit. Opposed involute walls extend within said orifice substantially along the width of the orifice whereby the involute walls stretch and conform to the opposed substantially flat parallel major surfaces of the flat cable when placed thereon, thus providing a secure, watertight interference fit.

DETAILED DESCRIPTION OF THE PREFERRED EMBODIMENTS

Figure 1:
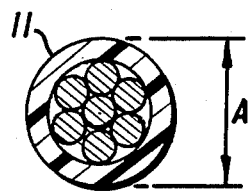
FIG. 1 is a cross-sectional view of a round insulated cable.
Figure 2:
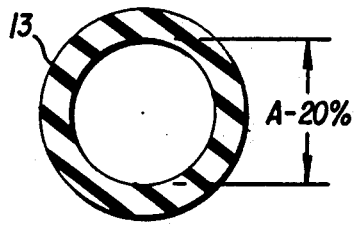
FIG. 2 is cross-sectional view of an interference fit sealing element used with the cable of FIG. 1.
Figure 3:
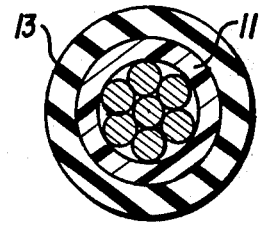
FIG. 3 is a cross-sectional view of the sealing element of FIG. 2 in place about the insulated cable of FIG. 1.

In underground wiring, common practice in jointing round secondary voltage cable watertight is to provide interference fit sealing elements. Elastomeric materials, such as EDPM rubber, are commonly used to obtain these interference fits. FIGS. 1, 2, and 3 illustrate such useage. FIG. 1 discloses a typical round insulated cable 11 with an outside diameter "A." FIG. 2 discloses a typical interference fit sealing element 13 having an inside diameter of "A" minus 20%. FIG. 3 illustrates sealing element 13 in place about cable 11. With the dimensions previously discussed, the configuration of FIG. 3 provides an interference fit between the cable and the sealing element of 20%.

The sealing element is designed to provide constant annular pressure against the cable without taking a permanent set. To provide a greater interference fit, the inside diameter of the seal can be decreased. The wall thickness of the seal can also be increased to obtain a higher annular pressure.

One typical use of the above type of seal is in an insulated underground bus which is used to terminate secondary voltage feeder cable and energize service cables. In one specific instance, the cable outlet covers have, at one end, six annular sealing rings to seal cables of various diameter. At their opposite end, the cable outlet covers provide interference fits with cylindrical insulated portions of the bus.

Another typical use is in submersible splice kits, which include a slice connector and a two-piece splice cover. The same annular sealing rings provide watertight interference seals to the insulated cable being spliced.

Figure 4:
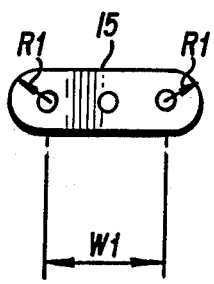
FIG. 4 is an end view of a flat cable having two conductors and a ground.

FIG. 4 illustrates a typical flat insulated cable 15 having two conductors and a ground. It is obvious that a round sealing element, such as shown in FIG. 2, would not be able to seal this cable in a watertight fashion. This is true since the round sealing element would not provide an interference fit against the flat sections of the cable.

In order to provide the proper interference fit, that is a seal which would provide an interference fit between the cable and a seal of 20%, a seal configuration is required with a periphery 20% less than the cable that would impart radial pressure to both the radial ends of the cable and to the flat sides of the cable.

Figure 5:
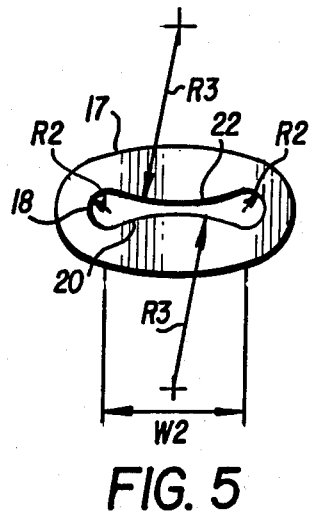
FIG. 5 is an end view of one embodiment of the sealing element of the present invention.
Figure 6:
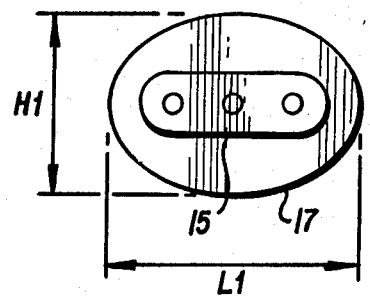
FIG. 6 shows the sealing element of FIG. 5 in place about the cable of FIG. 4.

FIG. 5 illustrates a seal which will provide the necessary interference fit, discussed above, when placed about the flat cable, such as shown in FIG. 4. FIG. 6 shows seal 17 in place about cable 15.

In order to develop radial pressure about the radial ends of the cable, the terminal radius R2 of orifice 18 must be smaller than radius R1 of cable 15, as shown in FIG. 4. Additionally, the centerline dimension, W2 of FIG. 5, is decreased with respect to W1 in FIG. 4 so as to further increase radial pressure. Radii R3, which are the radii for involute inner walls 20 and 22, intersect radii R2 so as to form the surface configuration as shown.

At assembly, as illustrated in FIG. 6, the radial pressure from radii R3 is applied to the flat portions of the cable along the area of W1, as indicated in FIG. 4. The radii R2, as previously discussed, provide radial pressure about the cable radii R1. Radial pressure is, therefore, applied about the entire periphery of the cable.

Pressure may be increased by increasing the dimensions H1/L1, as indicated in FIG. 6, and/or by reducing the periphery of the seal interface with respect to the periphery of the cable. Conversely, dimensions H1 and L1 may be reduced to lessen sealing pressure. The periphery of the sealing interface can also be made greater with relationship to the cable periphery to reduce pressure.

Figure 7:
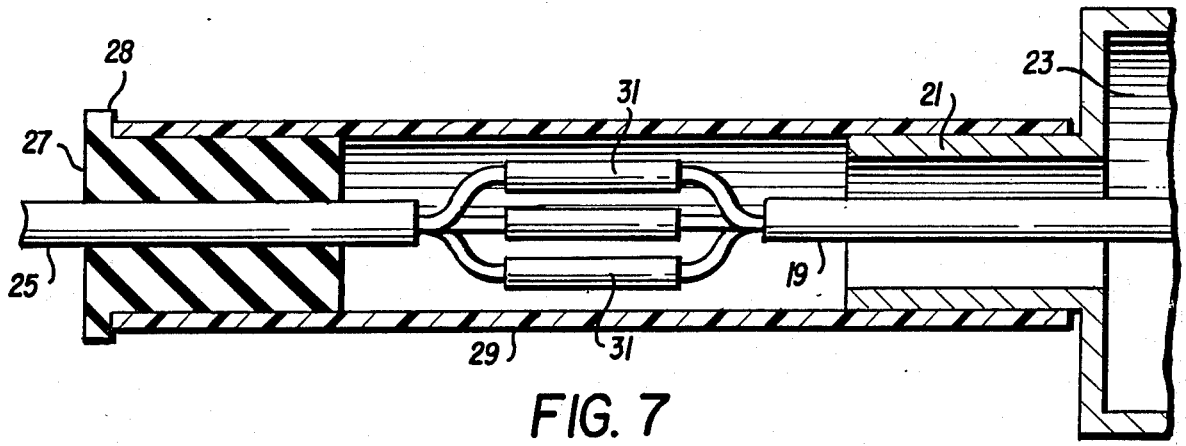
FIG. 7 is a cross-sectional view of a typical wiring installation using flat cable.
Figure 8:
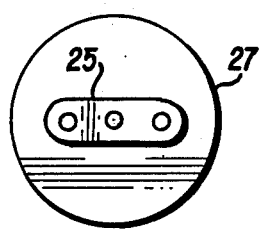
FIG. 8 is an end view of the flat cable and seal of FIG. 7.

As previously discussed, typical applications include street lighting and equipment wiring. FIG. 7 illustrates a typical configuration in wiring to an instrument transformer or similar control device where internal wiring is accompolished with flat cable. Cable 19 issuing from cylindrical cable port 21 of housing 23 is to be spliced to flat line cable 25. This is accomplished by sliding sealing element 27, including flange 28, which includes an orifice having a configuration as described in FIG. 5, and housing 29 over flat line cable 25 to provide room to splice the two cables. The cables are then spliced with connectors and insulated with round splice covers 31. Housing 29 is placed over the splice assembly and over cylindrical cable port 21, providing a watertight interference fit at that juncture. Sealing element 27 is then assembled to the opposite end of housing 29, providing interference fit seals about flat line cable 25 and about the internal diameter of housing 29. FIG. 8 is an end view of FIG. 7 at the flat cable sealing end.

Figure 10:
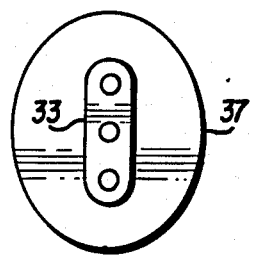
FIG. 10 is an end view of the assembly of FIG. 9.
Figure 9:
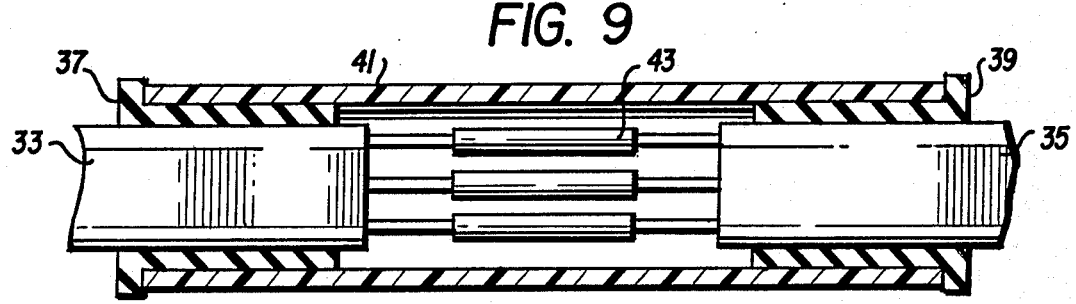
FIG. 9 ia a partial cross-sectional view of a splice assembly for use with flat cable.

FIG. 9 illustrates a splice assembly typically used in street lighting. Sealing elements 37 and 39 are installed at each end over cables 33 and 35. The assembly of this unit substantially follows that described relative to FIG. 7. FIG. 10 is an end view of FIG. 9 showing sealing element 37 in place over flat cable 33.

Figure 11:
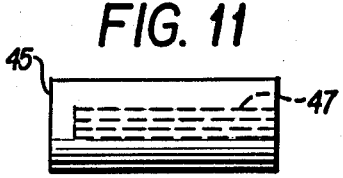
FIG. 11 is a side elevational view of a cable cap of the present invention.
Figure 12:
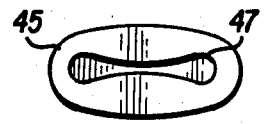
FIG. 12 is an end view of the cap of FIG. 11.

FIG. 11 is an illustration of cable cap 45 having an orifice 47, similar to the configuration of the orifice of FIG. 5, which is used in sealing moisture out of the flat cable end when it is exposed. FIG. 12 is an end view of sealing element 45, more clearly showing orifice 47.

Figure 14:
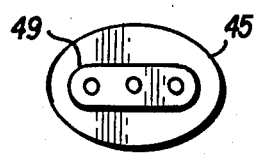
FIG. 14 is an end view of FIG. 13.
Figure 13:
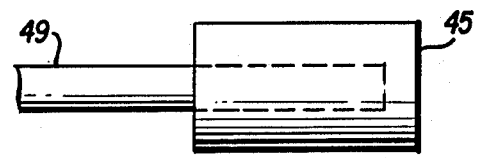
FIG. 13 is a side elevational view showing the cap of FIG. 11 in place about a flat cable.

FIGS. 13 and 14 illustrate the use of the sealing element of FIG. 11 with the flat cable 49, with FIG. 14 being an end view of sealing element 45 about cable 49.

Another use for flat cables is in a service entrance connection. The present method for assembling flat cable to a service entrance box requires that the installer use particular connectors which include an internally threaded bolt-on hub. In practice, a connector is threaded to the internal threads of the bolt-on hub. The cable is then assembled through the connector and the connector nut is tightened. By tightening the nut the neoprene bushing is compressed about the cable, providing a water-tight seal.

Figure 15:
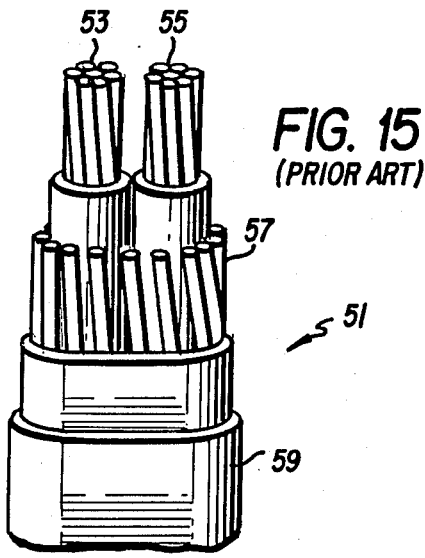
FIG. 15 is an enlarged view of one type of flat cable.
Figure 16:
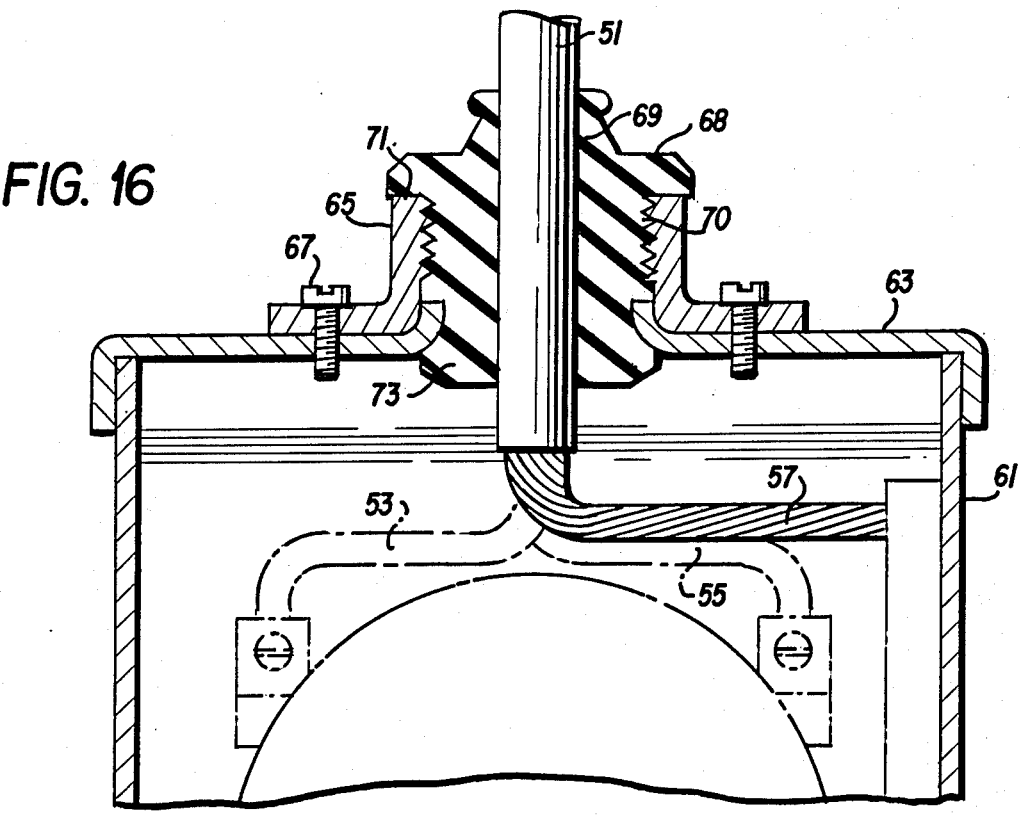
FIG. 16 is a partial sectional view showing a service entrance using the cable of FIG. 15.

Using the basic concept of the present invention, as illustrated in FIGS. 15 and 16, greatly simplifies and reduces the cost of this installation. FIG. 15 illustrates a typical flat cable 51 used in such installation. The cable includes conductors 53 and 55, ground 57 and insulation 59. Referring to FIG. 16, cable sealing element 68, in the form of a bushing which includes an orifice similar to that disclosed in FIG. 5, has an upper reduced section 69 and a protruding shoulder section 71. This bushing is placed over the end of the cable before the cable installation is stripped. After cable stripping and attaching the conductors and ground as illustrated, the bushing is pressed into hub 65, secured to cover 63 by bolt 67 effecting a permanent seal. As indicated in FIG. 16, three sealing areas are provided, namely, within threads 70, against the bolt-on hub by shoulder 71, and against upturned flange 73 of cover 63 for housing 61.

The principal advantage in using the sealing elements of the present invention for this particular application is that the seal is always uniform, and is not dependent on the skill of the installer. The previous method used, as discussed above, requires that the connector must be tightened all the way to effect a seal. Another advantage is that the rubber sealing elements of the present invention weather much better than plated steel connectors, which are normally used. A final advantage is that the rubber sealing element, or bushing, is less expensive than the metalic connectors now in use.

A further use for flat cables is in converted junction boxes. One such assembly is shown in FIGS. 17 and 18.

A standard octagonal junction box 77 having knockouts for providing borehole 83 is shown adapted for retention of standard adapter 79 having a threaded portion 80 which mates with locknut 81. Sealing bushing 85 includes cavity 87 having a dimension so as to provide an interference fit about adapter 79. The opposite end of the bushing contains orifice 89 configured in accordance with FIG. 5 and extending through the bushing to cavity 87.

Figure 18:
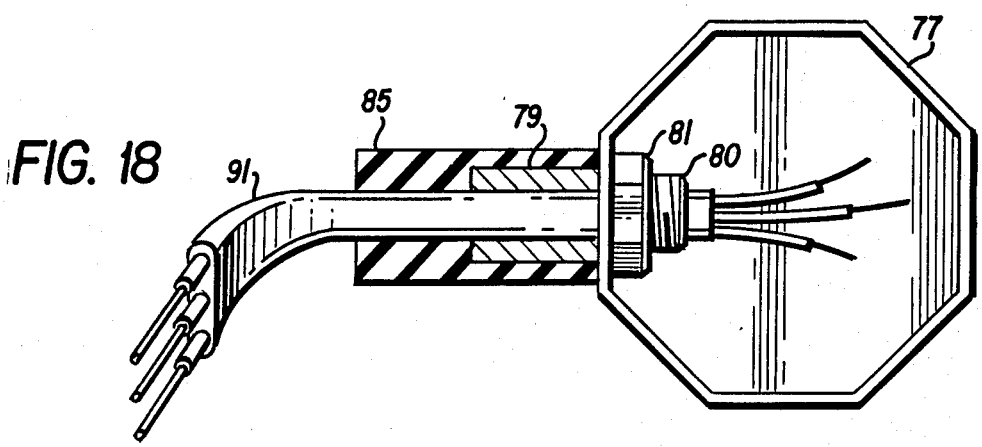
FIG. 18 is a partial sectional view showing the components of FIG. 17 assembled to a flat cable.

The assembled structure is shown in FIG. 18. Adapter 79 and bushing 85 are passed over cable 91 and secured to junction box 77 by locknut 81.

Figure 17:
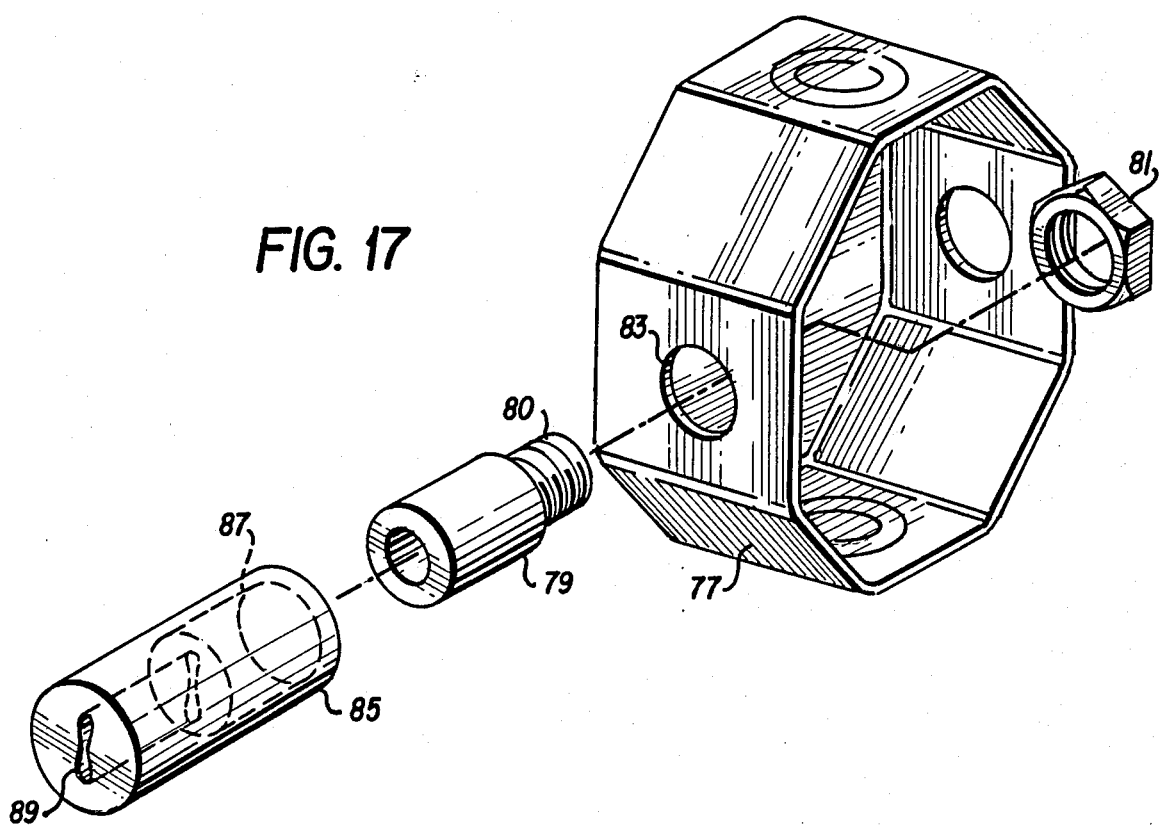
FIG. 17 is an exploded view showing a junction box using the cable of the present invention.

The construction shown in FIG. 17 and 18 replaces conventional Romex metal connectors now used with standard octagonal or rectangular boxes. The bushing seals the cable and provides an interference fit with the unthreaded portion of the adapter.

Figure 20:
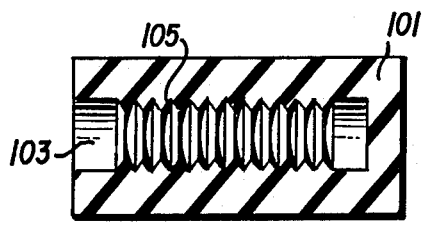
FIG. 20 is a sectional view taken along the line 20—20 of FIG. 19.
Figure 19:
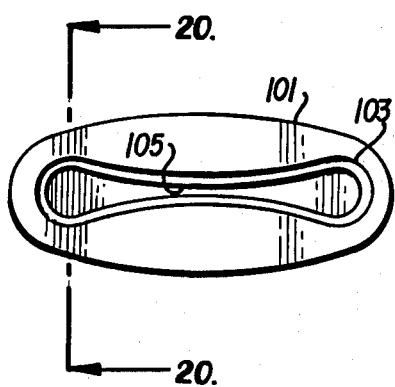
FIG. 19 is an end view of a modification of the cable cap of FIGS. 11 and 12.

FIGS. 19 and 20 illustrate the use of sealing rings 105 in a cable cap 101 having an orifice 103. Sealing rings 105 increase sealing capability where cable insulation has surface irregularities. While this feature is shown in a cable cap, it should be understood that this modification equally applies to all seal configurations described and discussed hereinabove.

As will be obvious, the predent invention provides a constant pressure interference fit which is watertight and may be used in various applications where flat cable is now in common use.

It is to be understood that the above description and drawings are illustrated only, since modifications could be made without departing from the invention, the scope of which is to be limited only by the following claims.

We claim:

1. A cable and sealing element comprising
    a flat cable having opposed rounded minor surfaces and opposed substantially flat parallel major surfaces;
    an elongated body of resilient material, said elongated body having a periphery greater than the periphery of said flat cable;
    an orifice extending longitudinally within said body having a width greater than its height and a periphery smaller than the periphery of said flat cable;
    opposed involute walls within said orifice extending substantially along said width of said orifice and extending the length of said orifice, and opposed arcuate end walls within said orifice interconnecting said opposed involute walls;
    said flat cable being inserted in said orifice with said opposed involute walls within said orifice stretching and conforming to the substantially flat parallel major surfaces of said cable and with said opposed arcuate end walls within said orifice stretching and conforming to the opposed rounded minor surfaces of said cable so as to provide a watertight interference fit entirely about said cable.

2. The cable and sealing element of claim 1 wherein each of said opposed arcuate end walls has a predetermined radius R2 and each of said opposed involute walls has a predetermined radius R3, and wherein R3 is greater than R2.

3. The cable and sealing element of claim 1 wherein said orifice extends through the length of said elongated body.

4. The cable and sealing element of claim 1 further comprising a flange extending about the circumference of one of said elongated body.

5. The cable and sealing element of claim 1 wherein said orifice terminates within said elongated body.

6. The cable and sealing element of claim 1 wherein said resilient material is EPDM rubber.

7. The cable and sealing element of claim 1 further comprising
    a peripheral shoulder about the periphery of said elongated body.

8. The cable and sealing element of claim 1 further comprising
    a cavity extending longitudinally within said elongated body from one end thereof; and
    wherein said orifice extends within said elongated body from the other end thereof and terminates at said cavity.

9. The cable and sealing element of claim 1 further comprising
    sealing rings formed in the inner surface of said orifice.

* * * * *